May 31, 1927.
E. C. STEERE
ELECTRIC WATER HEATER
Filed Nov. 19, 1925
1,630,909
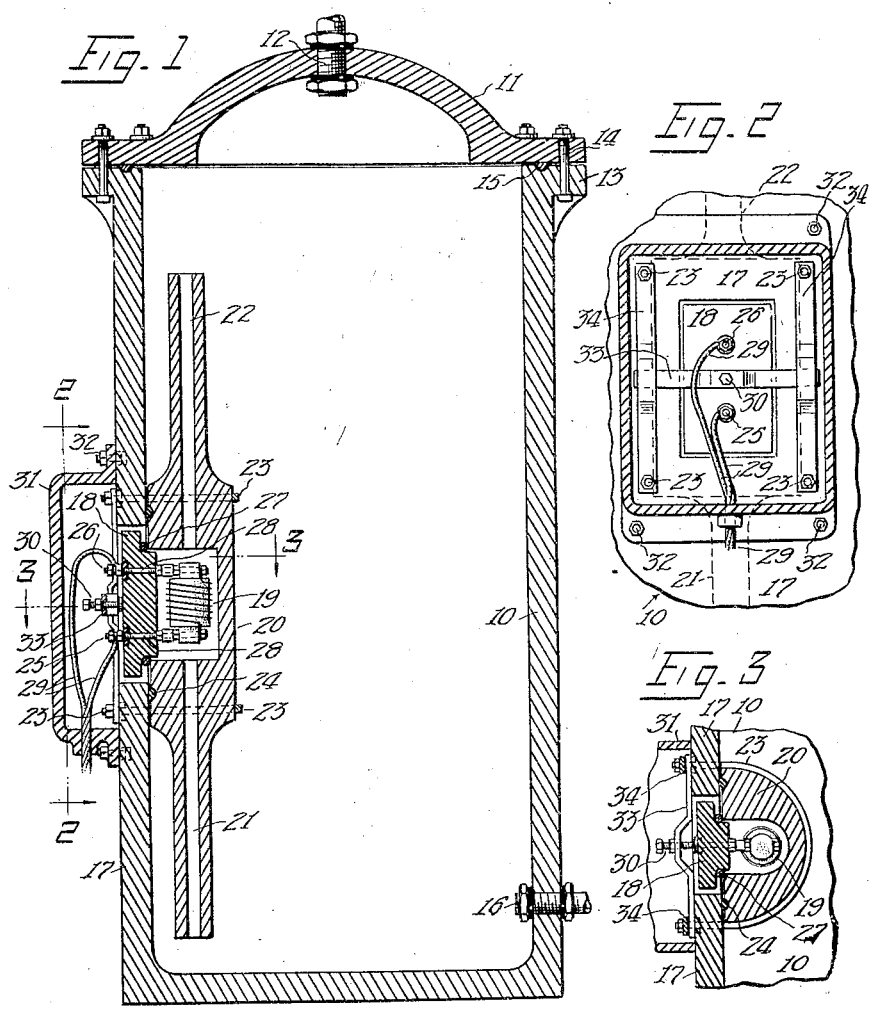
INVENTOR:
Ernest Charles Steere
BY: Ruege, Boyer & Bakelev
ATTORNEYS.

Patented May 31, 1927.

1,630,909

UNITED STATES PATENT OFFICE.

ERNEST CHARLES STEERE, OF SYDNEY, NEW SOUTH WALES, AUSTRALIA.

ELECTRIC WATER HEATER.

Application filed November 19, 1925, Serial No. 69,981, and in Australia December 16, 1924.

This invention relates to means for heating water contained in a vessel such as an urn, jug, or the like or for continuous or intermittent supply of heated water to a large container such as a bath and consists in the provision of an electrically insulating casing formed of porcelain or other suitable insulating material which is fitted with a suspended heating element and means for detachably mounting the casing within a container, the construction being such that a high electrical resistance is established between the heating element and the water inlet and outlet ports.

The walls of the casing are slotted or holed to permit free admission of and escape of water from the casing and are adapted for direct connection with water service and delivery pipes.

In the accompanying drawings:—

Figure 1 is a sectional elevation of a tubular casing mounted in an electrically insulating water container;

Figure 2 is a sectional elevation on the line 2—2 of Fig. 1.

Figure 3 is a sectional plan on the line 3—3 of Fig. 1.

An electrically insulating water container 10 is provided with a detachable cover plate 11 serving as an expansion chamber in which is mounted a delivery pipe 12. A flange 13 on the container permits attachment of the cover by means of bolts 14, and a water tight joint is formed by means of a rubber or similar gasket 15. The lower portion of one of the walls of the container is fitted with a water inlet pipe 16, and a central portion of one of the walls 17 is removed to permit the insertion of the lid 18 and the heating element 19 of an electrically insulating casing 20.

The casing 20 is constructed of any known form of electrical insulating material such as porcelain, and is preferably provided with a central chamber and tubular portions 21, 22, extending from opposite ends of said chamber. The casing is clamped to the container 10 by means of stirrups 23, and a water tight and insulating joint is formed by a rubber gasket 24.

The lid 18 of the casing carries terminals 25, 26 and a water tight and insulating gasket 27. The terminals are connected with the leads 28 of the heating element 19 and with the leading in wires 29—29 which enter through an aperture in an exterior cover 31 of the container. This cover is secured to the container by suitable studs and nuts 32.

The lid 18 is adapted to be locked in position by an offset bar 33 the ends of which are retained by cross parallel bars 34—34 which are bolted to the container by the bolts of the stirrups 23. A locking bolt 30 provided with a lock nut is threaded through the bar 33 and engages a metal washer on the lid 18.

When water fills the casing 20 the water in the passage ways 21—22 furnishes a water column of high electrical resistance between the heating element 19 and the ends of the casing so that the user of the device is effectively protected.

I claim.

1. An electrical water heater, comprising a water container, a hollow casing mounted in said container, a heating element disposed within said casing, said casing having open tubular portions in communication with the container at opposite ends of the heating element whereby the latter is exposed to a continuous circulation of water passing through said casing, the relative disposition of said heating element and tubular portions being such as to provide a water column of high electrical resistance between the heating element and the ends of the casing.

2. An electrical water heater, comprising a water container, an elongated casing mounted in said container and having a central chamber and tubular portions extending from opposite ends of said chamber into communication with the container, and a heating element disposed within said chamber in alinement with said tubular portions whereby the heating element is exposed to a continuous circulation of water passing through said casing and a water column of high electrical resistance is formed between the heating element and the ends of the casing.

3. An electrical water heater, comprising a water container, an elongated casing having a central chamber and tubular portions extending from opposite ends of said chamber, means for removably supporting the casing within the container, the tubular portions of said casing being in communication with said container, and a heating element removably supported within the chamber of said casing and insulated therefrom and from the container, said heating element being disposed in alinement with the tubular portions of the casing whereby the heating element is exposed to a continuous circulation of water passing through said casing and a water column of high electrical resistance is formed between the heating element and the ends of the casing.

In testimony whereof I affix my signature.

ERNEST CHARLES STEERE.